May 7, 1963 E. W. ZEARFOSS, JR 3,088,290
PRESERVATION OF FOODS BY REFRIGERATION
Filed Jan. 4, 1960 3 Sheets-Sheet 1

INVENTOR.
ELMER W. ZEARFOSS, JR.
BY
Harry W. Hargis III
AGENT

May 7, 1963  E. W. ZEARFOSS, JR  3,088,290
PRESERVATION OF FOODS BY REFRIGERATION
Filed Jan. 4, 1960  3 Sheets-Sheet 2

INVENTOR.
ELMER W. ZEARFOSS, JR.
BY
Harry W. Hargis III
AGENT

May 7, 1963 E. W. ZEARFOSS, JR 3,088,290
PRESERVATION OF FOODS BY REFRIGERATION
Filed Jan. 4, 1960 3 Sheets-Sheet 3

INVENTOR.
ELMER W. ZEARFOSS, JR.
BY
Harry W. Hargis III
AGENT

United States Patent Office 3,088,290
Patented May 7, 1963

3,088,290
PRESERVATION OF FOODS BY REFRIGERATION
Elmer W. Zearfoss, Jr., Philadelphia, Pa., assignor, by mesne assignments, to Philco Corporation, Philadelphia, Pa., a corporation of Delaware
Filed Jan. 4, 1960, Ser. No. 229
1 Claim. (Cl. 62—78)

The present invention relates to a method of and apparatus for preserving foods, and more particularly to the preservation of foods by refrigeration techniques.

While of broader applicability, the invention is directed particularly to the field of domestic refrigerators wherein it is desirable to provide optimum storage conditions for the extended preservation of a variety of perishable foods, such for example as fresh meats, vegetables, fruits, dairy products and leftovers.

To extend the storage life of foods, changes tending to cause deterioration must be retarded. In this connection it will be demonstrated that chemical and microbial changes in foods are minimized by the storage thereof in low-temperature ambient atmospheres. Also, it will be demonstrated, in the interest of a better understanding of the invention, that changes such as food drying and shriveling, which have long been encountered by users of domestic refrigerators, depend upon the humidity and movement of the surrounding air, as well as upon the surface characteristics of the food.

Accordingly the present invention is directed toward achievement of optimum storage for most fresh foods in a household refrigerator by maintaining air temperatures therein at the threshold of freezing, while maintaining this air at a high humidity and relatively still.

It is an important specific objective of the invention to establish conditions conducive to formulation of an index or standard to serve as a guide in the achievement of satisfactory fresh food preservation.

Still another important objective of the present invention is to provide means for achieving optimum ambient atmospheric conditions for the storage of fresh foods of different types, and to extend the time during which foods may be stored, well beyond the times achieved by prior practice.

In the achievement of the foregoing objectives, and in accordance with important features of the invention, the method and apparatus of the present invention contemplate storing food in a substantially sealed compartment having substantially all wall portions formed of a material having a relatively high thermal conductivity. The temperature within the compartment is maintained at the threshold of freezing, while thermosyphonic flow of air therein is prevented by cooling all exterior portions of the compartment walls to substantially the same temperature, this being a temperature near or slightly below the temperature desired within the compartment.

The manner in which the foregoing as well as other objects and advantages of the invention may best be achieved will be more clearly understood from a consideration of the following description taken in light of the accompanying drawings, in which.

Prior to a detailed consideration of the invention it is important first to define what I have found to be the optimum storage conditions with which the invention is concerned, it being important to distinguish between conditions desirable for ripening, aging and maturing after harvest or production, and those conditions which thereafter are best for preserving the foods. It should be further recognized that a so-called "fresh food" may have a questionable history when marketed to the buyer, and may be rapidly losing its quality and approaching the end of its edible life. In any event, it might be considered that the optimum conditions for fresh food preservation in the household refrigerator are those which effect maximum edible life of the stored foodstuffs commensurate with their market day quality.

Chemical and microbial changes capable of effecting deterioration of foods are retarded or minimized by maintenance of low temperature ambient atmospheres. To illustrate the relationship between microbial growth rate and refrigeration temperatures, and with particular reference initially to FIGURE 3 of the drawings, petri dishes, shown somewhat diagrammatically at 30 and filled with sterile nutrient agar (not shown), were streaked with species of food-destroying microorganisms and incubated in both saturated (100% R.H.) and dry (40% R.H.) air at temperatures of 45, 39 and 33° F., respectively, for seven days. The microorganisms used were a mixed culture bacteria which had been isolated from spoiled refrigerated beef, a pure culture of bacteria from spoiled peas, and a mold isolated from fresh vegetables. Represented graphically in FIGURE 3 are photographs of the dishes 30 taken on the third, fifth and seventh days of incubation, the incubated microorganisms being designated generally by numerals 31 and 32.

Figure 3:
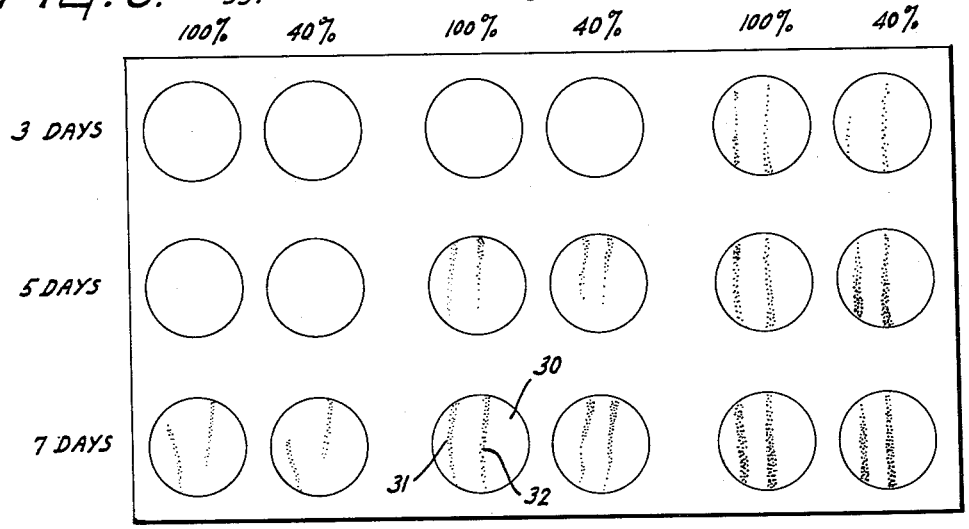
FIGURE 3 is a graphical representation of the effects of temperature and humidity on the growth rate of food microorganisms (bacteria and mold)

According to the showings of FIGURE 3, reducing the refrigeration temperatures to the threshold of freezing (see 33° F. column) effected a significant decrease in microbial growth, and indicated that fresh foods stored at this temperature would exhibit minimum microbial spoilage. The substantially identical growth rates of the cultures at 40% and 100% R.H., when incubated at the same temperatures, show that the temperature is the dominating factor. It is thus apparent that one shortcoming usually associated with high humidity, the sliming of meats, can be curtailed effectively by maintaining temperatures thereof at the threshold of freezing.

Another benefit derived from maintaining lower food temperatures is the slowing down of the natural chemical changes which result in browning and softening of many fresh foods.

Also an important factor in the degradation of refrigerated foods is desiccation. The problem of foods drying and shriveling has long been recognized and is a common source of complaints about household refrigerators.

The rate at which a particular food will lose moisture depends upon its surface characteristics as well as upon the temperature, humidity and movement of the ambient air. To show the effects of these factors, the dehydration rate of freshly opened canned peas was determined at various relative humidities and temperatures, in still air, in accordance with procedure hereinafter to be described.

Figure 4:
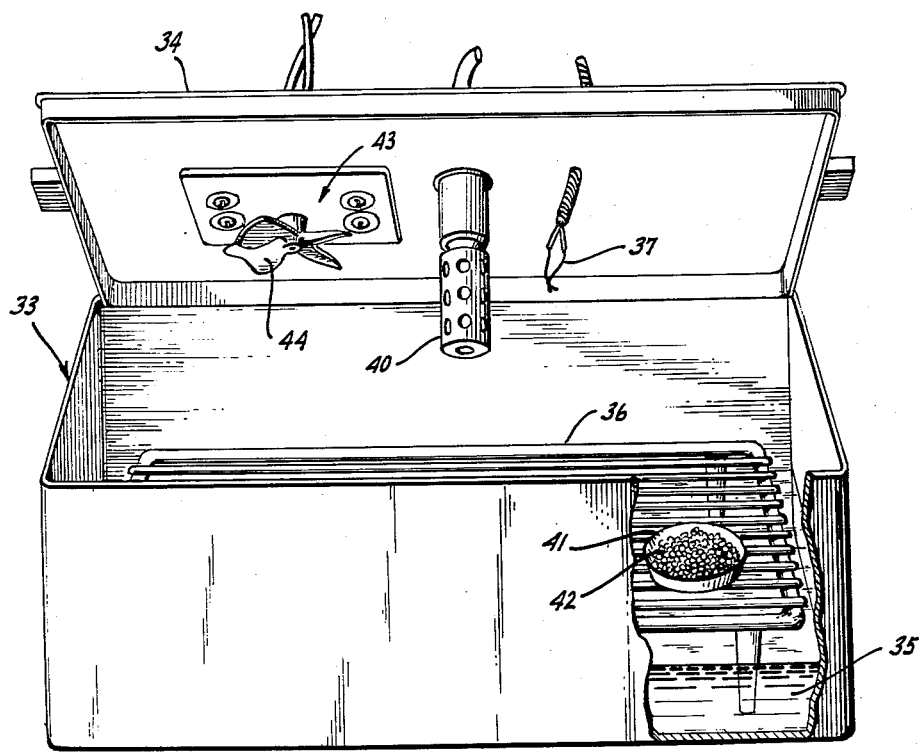
FIGURE 4 is a perspective showing, with parts broken away, of test apparatus for determining the effects of temperature, percent relative humidity, and air movement upon the desiccation of foods.
Figure 5:
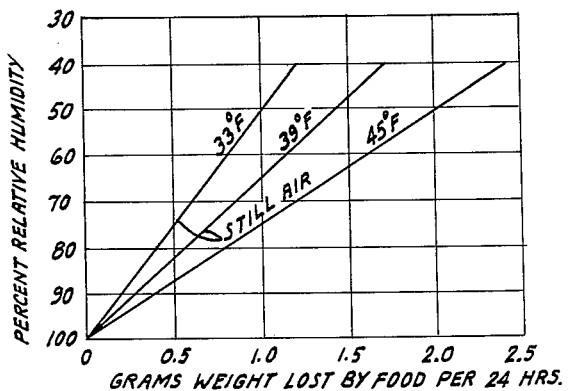
FIGURE 5 is a graphical representation of the effects of temperature and percent relative humidity on the desiccation of foods.

In performance of these tests, and making reference to FIGURE 4, the various desired relative humidities were maintained in 4" x 8" x 11" plastic containers of the type seen at 33, including covers 34 arranged to seal the same, by means of different solutions of water and glycerine, as seen at 35. Items placed in each container were supported upon a trivet 36 above the surface of the solution 35. A thermocouple 37 and an electric hygrometer sensing element 40, each of known design, were supported within each container from the inner surface of cover 34. Four such containers holding glycerine-water solutions calculated to provide relative humidities of 100, 80, 60 and 40%, respectively, were placed in a constant temperature, refrigerated cabinet (not shown). A dish 41 containing approximately 50 grams of pre-chilled canned peas 42 was weighed and placed in each chamber or container 33. After three days, each dish was again weighed, and the weight loss per 24 hours was computed for each dish. Tests were conducted in this manner in ambient atmosphere temperatures of 45, 39 and 33° F. Results of these tests (see FIGURE 5) show the relationship between evaporation rate, temperature and relative humidity.

Figure 6:
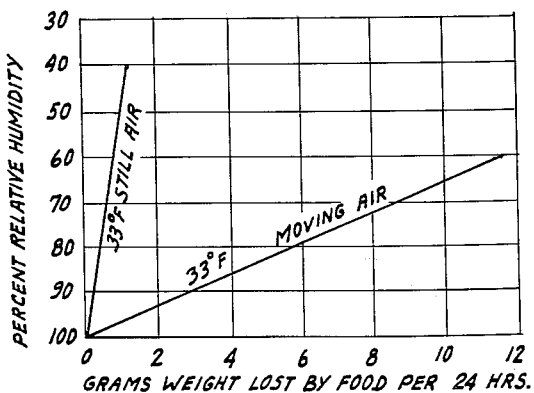
FIGURE 6 is a graphical representation of the effect of moving air on the desiccation of foods at the threshold of freezing.

To simulate the effects of natural convection currents in a conventional refrigerator, a fan means 43 (FIGURE 4) with a 2" diameter blade 44 was mounted immediately above the food sample in each container. The fan motors (not shown) were disposed exteriorly of each container and adapted to rotate the small fan blades at the rate of 600 r.p.m., to induce mild air circulation in each of the containers. The 24 hour weight loss was determined, at the different humidities, at 33° F. The moving-air evaporation rates are compared with 33° F. still-air evaporation rates, in FIGURE 6, at different relative humidities. These curves illustrate the large increase in evaporation rate which I found to be caused by a relatively small air movement. It is in order to mention at this point that a substantial lack of air movement also retards propagation of air-borne mold spores and odors throughout a storage compartment, which characteristic is also an important feature of the invention.

It should be noted that the rate at which a particular food loses moisture to the ambient atmosphere also depends upon its exposed surface area and the nature of its surface. Thus, various foods demonstrate different weight losses per 24 hours under the same conditions. Canned peas were selected for the above described tests for reasons of convenience and repeatability.

Figure 7:
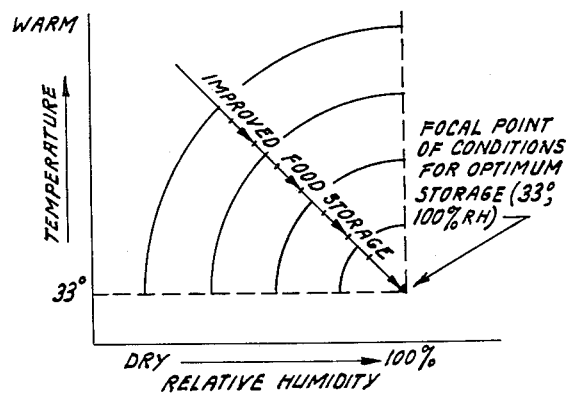
FIGURE 7 is a graphical representation of the effects of temperature and humidity upon the storage life of perishable foods.

Importantly, analysis of the results of these studies has led to the discovery that the optimum storage condition for preservation of most foods in a household refrigerator is at what might be termed a focal point defined by: temperature at the threshold of freezing; high humidity; and still air. This condition is illustrated graphically in FIGURE 7.

In further accordance with the invention, the mode of achieving the above described optimum environment in a unitary organization of elements will be fully understood from a consideration of what follows.

Figure 1:
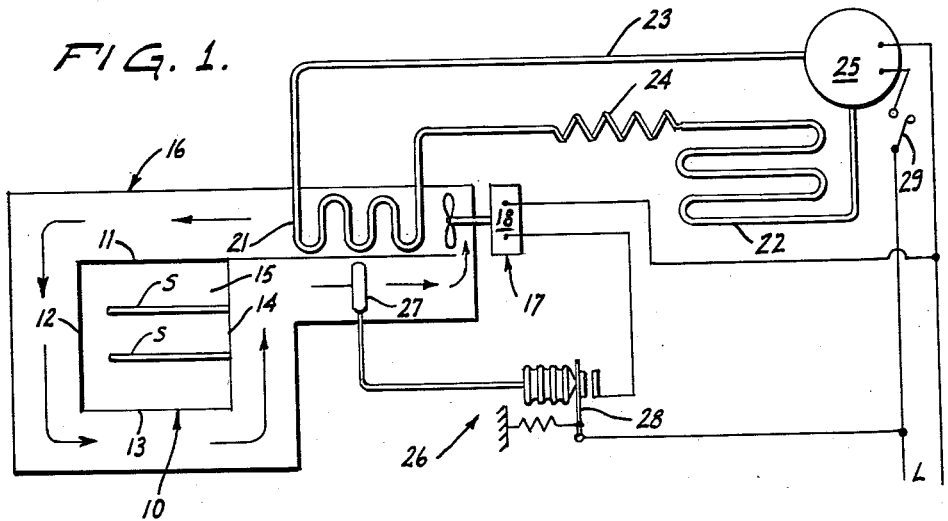
FIGURE 1 is a somewhat diagrammatic showing of equipment embodying principles of the invention, in its apparatus aspect, and well adapted to the practice of the novel method of my invention.

When the surface of a hollow geometrical structure, such as the compartment 10 seen in the embodiment of FIGURE 1, for example, exists at a uniform temperature, the volume enclosed by its walls 11—15 will be held at this temperature. Further, moist foodstuffs disposed within this structure, for example upon shelves S, will produce a saturated vapor-air mixture. Any temperature depression of a given wall or boundary surface area causes water vapor to condense from the mixture upon this given area, thereby decreasing the vapor pressure and humidity within the structure. Correspondingly, the vapor pressure differential thereby effected between foodstuffs and the unsaturated air comprises the mechanism for food desiccation or dehydration. Dehydration rate depends upon the magnitude of the structure surface area affected and the temperature deviations thereof. Further food dehydration will occur when the compartment is not vapor-tight. Basically, these parameters define the problems involved in producing and controlling a saturated vapor-air mixture in a compartmented section of a refrigerator.

Refrigerators have been compartmented in the art, the compartments doing little more than providing convenient storage for a single group of foodstuffs. Individual compartments various have accommodated vegetables, fruits, meats and dairy products. In some instances the design temperature or humidity has been expressed in such relative terms as "high humidity" or "low temperature." Compartment designations or trade names frequently have possessed an environmental connotation to support this theme. In any case, these compartments for the most part have exhibited various uncontrolled psychrometric properties.

Although trends in the art give emphasis to food preservation, domestic refrigerators are as a rule lacking in provision of a single compartment for combining and storing adequately the diverse groups of foodstuffs that benefit from controlled temperature and humidity. This need I have filled by the method and apparatus herein disclosed.

With further reference to FIGURE 1, and in particular accordance with my invention, means for achieving uniform cooling of thermally conductive walls 11—15 comprises air duct means 16 provided with fan means 17 disposed and adapted to circulate air in high heat exchange relation with an evaporator coil 21 and all exterior surface portions of the compartment 10. Evaporator coil 21 is part of a conventional closed refrigeration system comprising a motor-compressor 25, suction line 23, capillary tube restrictor 24, and a condenser 22. The motor-compressor 25 is energized by line L having suitable control-switch means 29 in series therewith. The degree of cooling by the circulating air is determined by a thermostatic control 26 having a sensing element 27 operatively connected, through a bellows as shown, with a switch 28. Switch 28 is disposed in series electrical circuitry with the fan motor 18 and line L and is effective alternately to energize and deenergize the fan means responsive to predetermined upper and lower required circulating air temperature limits, thereby to provide threshold of freezing temperatures in compartment 10. Desirably the temperature differential used for control purposes is kept as small as possible.

Figure 2:
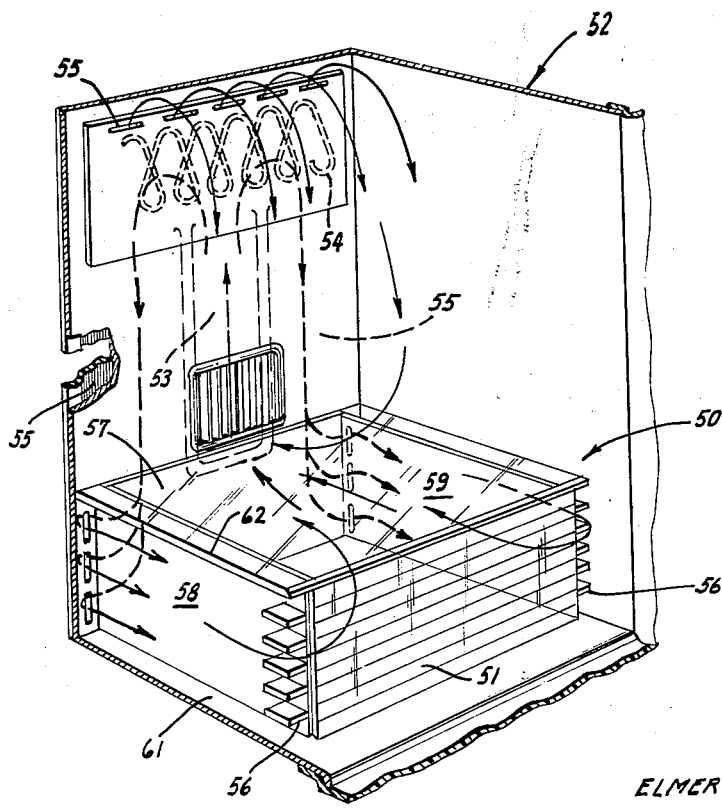
FIGURE 2 is a fragmentary perspective showing, with parts broken away, of more refined apparatus embodied in a domestic refrigerator of known type.

As best seen in FIGURE 2, the optimum conditions for storing, satisfactorily, a wide variety of foods, as described earlier may be achieved by provision of a vapor-sealed compartment 50 having a separate closure 51 and disposed within the cabinet liner 52 of a domestic refrigerator. Constructural features of such a preferred embodiment are clearly shown in FIGURE 2, and inventive aspects of this embodiment—to be distinguished from the broader genus invention claimed herein—are disclosed and claimed in the copending application of N. J. D'Aleandro et al., Serial No. 838,953, filed September 9, 1959, now U.S. Patent 2,978,884, issued April 11, 1961, and assigned to the assignee of the present invention.

In the reference embodiment, air is drawn from within the cabinet 52 by a fan (not shown) into a duct 53 and directed over an evaporator 54. The refrigerated air is then divided, one part being discharged through the ports 55 to the upper regions of cabinet 52, while the second part flows downward through a pair of ducts 55 toward the lower portion of the cabinet and through louvers 56. As is the case in the embodiment illustrated in FIGURE 1, arrows show that four vertical walls 51, 57—59 of the sealed compartment 50 are literally wrapped in cold air. When an insulated freezer section (not shown) is located below the bottom wall 61 of fresh food compartment 50, as is the case in FIGURE 2, passage of air beneath compartment 50 is optional. The air system, powered by a small motor and blower assembly, has a thermostatic control (not shown). The compartment readily accommodates assorted vegetables, fruits, cold cuts, meats, leftovers, etc., all stored uncovered, and the functional organization of the compartment can be adapted to individual preferences.

In any embodiment of this invention the compartment, sealed to perform at saturated humidity, must be cooled on its boundary surfaces, and, since gradients in surface temperature reduce the relative humidity, as shown above, the boundary temperature must be as uniform as good design can achieve. This is the primary and central objective of my invention and use of thermally conductive materials, especially in compartment vertical wall sections 51, 57—59, helps to achieve this objective.

It is to be noted that forced air circulation is used since a forced system allows a higher rate of air circulation than does a thermosyphonic system, and a correspondingly decreased temperature differential is achieved throughout the complete forced-air circuit. This decreased differential minimizes compartment surface temperature gradients and affords a marked improvement in overall design.

Advantages contributed by forced air-cooling of a low temperature, high humidity compartment can be summarized as shown below:

(1) Following cabinet usage, forced-air provides rapid recovery to the optimum temperature. This is an important factor in food storage life. It will be observed that the use of a separate compartment closure further minimizes cabinet usage effects.

(2) Moisture deposited upon surfaces exterior to the sealed compartment during refrigerator cabinet usage is evaporated readily by forced-convection.

(3) To avoid freezing of the foodstuffs, temperature variations in the critical near-freezing zone must be minimized, and forced air, controlled by a reliable thermostat, helps solve this tolerance problem.

(4) Perhaps most importantly, compartment surface temperature gradients are minimized by directing uniformly cooled forced air to these surfaces.

As previously described, surface temperature gradients have an undesirable effect on the compartment humidity. There is, however, another more subtle and significant thermal mechanism stemming from the gradients. Convection currents may be induced within the compartment by uneven temperature distribution on the compartment boundary, particularly if the surface temperature of top wall 62 (FIGURE 2) is depressed. Convection currents within the compartment supplement the slower process of pure vapor pressure diffusion and have a marked effect on food desiccation, as hereinbefore described. Consequently, the migration of moisture from the foodstuffs to the interior surfaces of the compartment walls is doubly dependent upon the temperature pattern across the compartment walls or boundary.

Positioning the sealed compartment below a higher temperature region, as seen in FIGURE 2, reverses the direction of heat flow through compartment top wall 62. This arrangement, by increasing the top wall temperature, curtails the development of convection currents, and obviates moisture accumulation and drippage upon the compartment contents. Condensation on the inner surface of wall 62 during usage of the compartment facility will subsequently migrate to cooler side wall surfaces within the compartment. Moisture on the side wall surfaces present no drippage problem. Also, according to usual practice, temperatures in the 36 to 40° F. range are necessary for acceptable "natural" or cyclic defrost of the evaporator 54 (FIGURE 2) in the cabinet. This higher temperature zone, external to the sealed compartment, fortunately coincides with the needs of other groups of foodstuffs, and can be compartmented for utility and styling or left with open shelves. These regions will provide satisfactory storage for canned foods, bottled goods and beverages, dairy products and other foods not readily desiccated or deteriorated by higher temperatures. However the foregoing, and other advantages of the particular embodiment shown in FIGURE 2, will be best understood by a detailed consideration of the above-mentioned copending disclosure.

Food preservation tests were conducted on a refrigerator equipped with a sealed compartment designed to provide optimum storage conditions. The compartment was loaded with a cross-section of foods especially responsive to temperature and/or humidity. These included—all uncovered: Meats—chicken, pork chops, hamburger, steak and lunch meats; Vegetables—celery, lettuce, tomatoes, parsley; Leftovers—mashed potatoes, whipped cream, a sandwich, sliced tomatoes and chocolate pudding. Using a group of current model domestic refrigerators available on the market, similar foods were placed in the recommended storage region or facility of each such refrigerator. Observations were made of all foods on a daily basis by a panel comprising personnel cognizant of the requirements for food handling and preparation.

The optimum temperature and humidity "air-wrapped" compartment exhibited excellent preservation of all food specimens, both from a quality and a time duration standpoint. No other refrigerator came close to matching this performance. These tests confirmed the premise, hereinbefore developed, that a near-freezing temperature, for example at the threshold of freezing, a high humidity, and still air, define the optimum conditions for fresh food preservation.

It is clear from the foregoing description, and test data, that this invention constitutes a significant contribution in the field of food preservation. The effectiveness of the invention, in inhibiting growth of mold spores and food destroying bacteria, is such as to make possible substantial extension of the time during which foods may be preserved in a domestic refrigerator, the invention serving also to prevent desiccation and to ensure fresh and palatable appearance of the food throughout its entire period of storage.

I claim:

In the art of refrigeration, the method of effecting extended preservation of moist foods which consists of placing such foods in a box-like container having top, bottom, and vertical side walls of a material of relatively high thermal conductivity, and maintaining air temperature in the container just above the freezing temperature of water and at a high relative humidity while preventing thermosyphonic flow of air within said container, by subjecting the exterior surfaces of said side walls to a horizontal fan-forced flow of air maintained at near freezing temperature, said air having substantially the same temperature value as it contacts said walls throughout the height thereof, thereby to cool the interior surfaces of said side walls to a temperature just above the freezing point of water.

References Cited in the file of this patent

UNITED STATES PATENTS

| | | |
|---|---|---|
| Re. 21,144 | Dodge | July 11, 1939 |
| 35,626 | Roberts | June 17, 1862 |
| 1,828,179 | Gallagher | Oct. 20, 1931 |
| 2,203,033 | Spiegl | June 4, 1940 |
| 2,216,365 | Fernandez | Oct. 1, 1940 |
| 2,270,844 | Hedlund | Jan. 27, 1942 |
| 2,322,882 | Raskin | June 29, 1943 |
| 2,373,618 | Tobey | Apr. 10, 1945 |
| 2,486,876 | Protzeller | Nov. 1, 1949 |
| 2,517,686 | Larkin | Aug. 8, 1950 |
| 2,529,734 | Lehmann | Nov. 14, 1950 |
| 2,541,861 | Chambers | Feb. 13, 1951 |
| 2,629,232 | Latham | Feb. 24, 1953 |
| 2,644,317 | Haywood | July 7, 1953 |
| 2,712,733 | King | July 12, 1955 |
| 2,882,701 | Nelson et al. | Apr. 21, 1959 |
| 2,933,398 | Hestues | Apr. 19, 1960 |
| 2,978,884 | D'Aleandro | Apr. 11, 1961 |
| 3,008,838 | Brunsing | Nov. 14, 1961 |

FOREIGN PATENTS

| | | |
|---|---|---|
| 944,495 | Germany | Oct. 31, 1956 |